Figure 1:
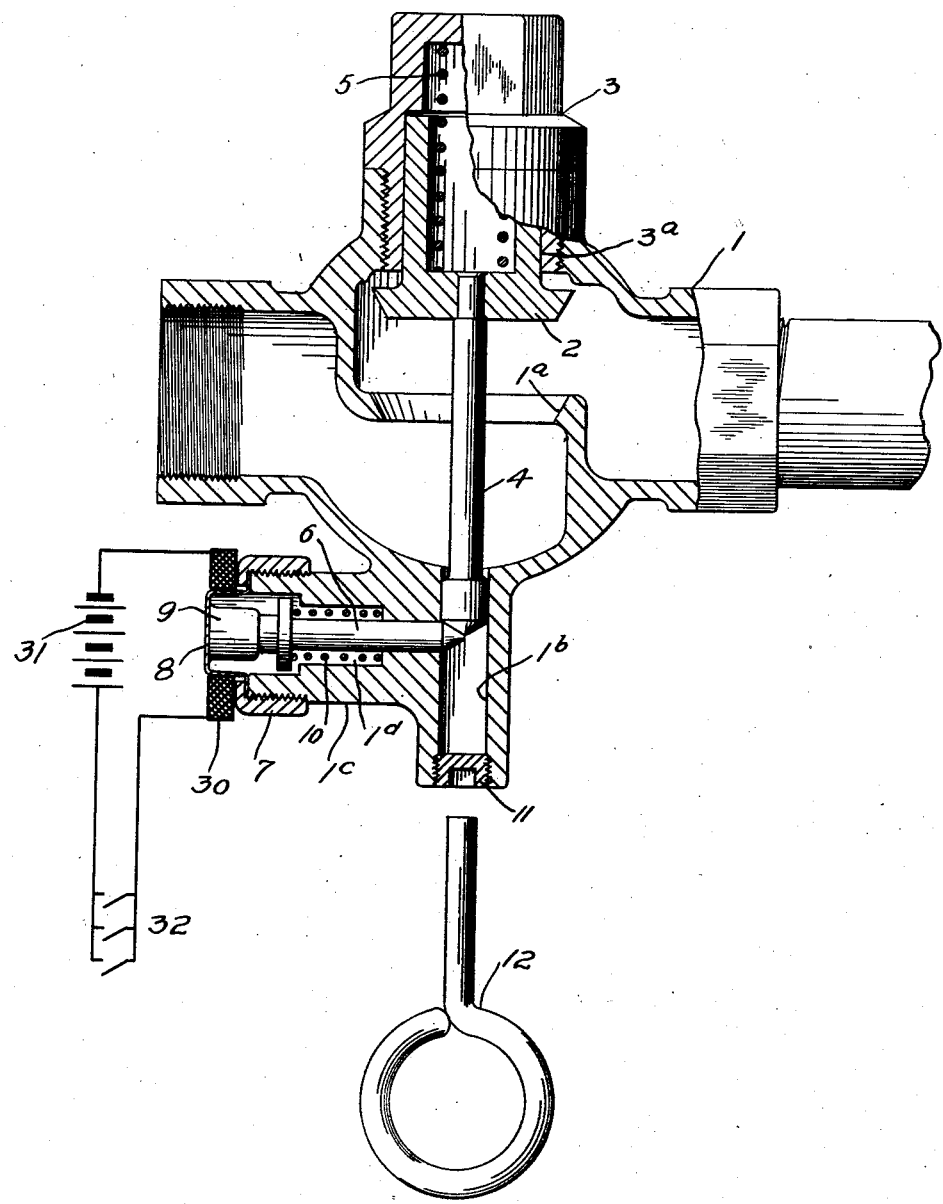

Nov. 28, 1939.  H. H. SHIELS  2,181,523
SHUT-OFF VALVE
Filed Nov. 29, 1937   2 Sheets-Sheet 1

INVENTOR:
H. H. Shiels
BY O O Martin
ATTORNEY.

Nov. 28, 1939.  H. H. SHIELS  2,181,523
SHUT-OFF VALVE
Filed Nov. 29, 1937   2 Sheets-Sheet 2
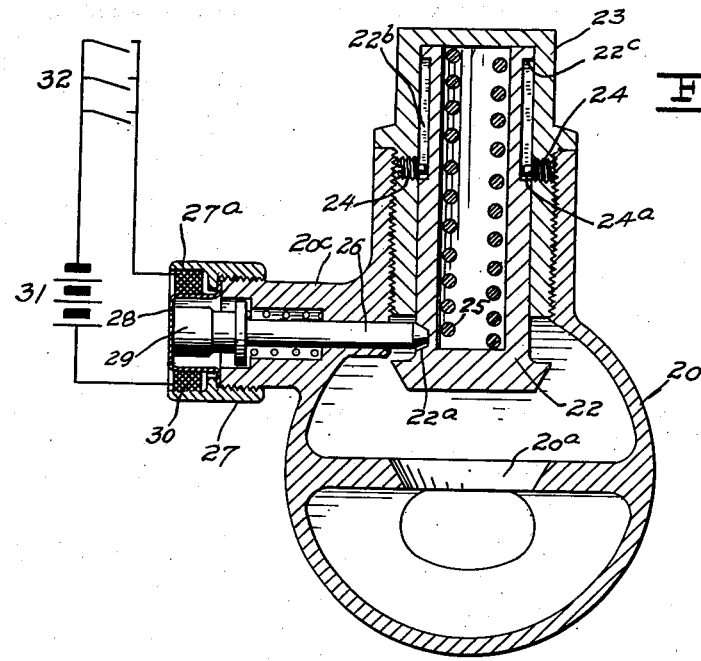
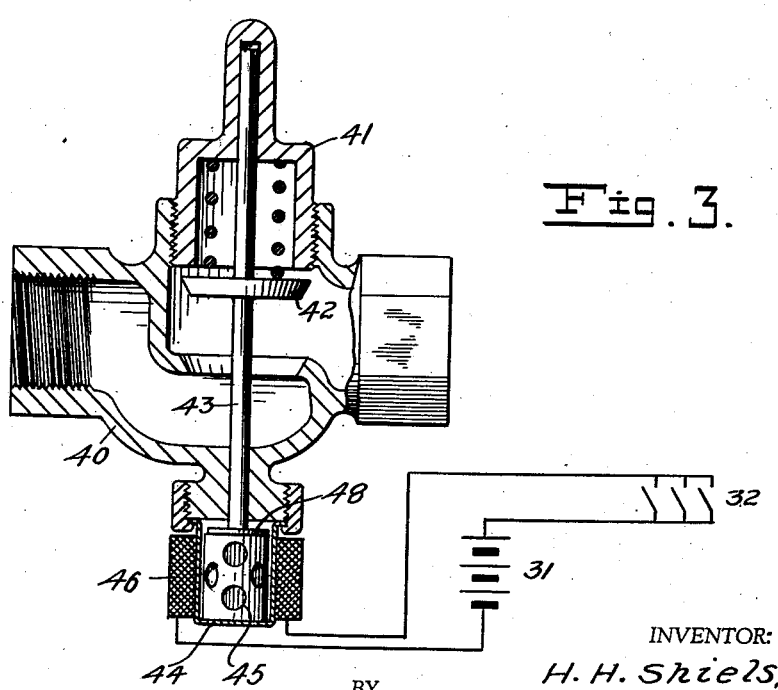
INVENTOR:
H. H. Shiels,
BY  O O Martin
ATTORNEY.

Patented Nov. 28, 1939

2,181,523

UNITED STATES PATENT OFFICE 2,181,523

SHUT-OFF VALVE

Herbert H. Shiels, Culver City, Calif.

Application November 29, 1937, Serial No. 176,943

7 Claims. (Cl. 137—162)

This invention relates to valves and particularly to means controlling the operation of valves, such as commonly employed in connection with gasoline storage tanks, service pipes and the like, to shut off the flow through the pipe system in case of fire or other emergency.

It is the general object of the invention to provide simple and efficient means for automatically disrupting the flow through a pipe system in case the temperature in the vicinity of such means rises sufficiently to create danger of explosion. It is a further object of the invention to provide means controlled from a distant point to operate said valve means to disrupt the flow through such system at any time it may be thought necessary.

To this end, the invention consists in the combinations hereinafter fully described and illustrated in the accompanying drawings, of which:

Fig. 1 is a sectional side elevation taken substantially through the center of a valve mechanism embodying the invention, Fig. 2 is a sectional end elevation through the center of a slightly modified form of device, and Fig. 3 is a sectional side elevation of a further modification of the invention.

The structure of Fig. 1 comprises a casing 1, having a centrally located seat 1ª for a longitudinally movable valve 2. The top of the casing is shown threaded to receive a screw cap 3, having a cylindrical recess 3ª, within which the cylindrical stem of said valve is fitted to slide. The bottom of the casing is made with a bore 1ᵇ, concentric with the valve stem, and a pilot rod 4, of the valve, is seated to slide within this bore. A spring 5 constantly urges the valve towards the seat.

The casing is near the bottom made with a lateral projection 1ᶜ, having a bore 1ᵈ leading into the bore 1ᵇ. A plunger 6 is seated within this projection and its inner end extends into the bore 1ᵇ far enough to project underneath the pilot rod 4, normally to maintain the valve open. The projection 1ᶜ is shown threaded to receive an annular screw cap 7, shaped to maintain a thimble-shaped shell 8 tightly seated against the end of the projection. This shell is shown partly filled with a suitable fusible metal alloy 9, against which the outer end of the plunger 6 is urged by a spring 10.

From this, it is seen that the plunger 6 normally maintains the valve open and that, in case the temperature surrounding the valve rises to the danger point, the alloy is caused to fuse and to permit the spring 10 to withdraw the plunger from the pilot rod. The spring 5 is then free instantly to seat the valve.

When it is again desired to open the valve, it is advisable first to unscrew the cap 7 and to remove the shell 8 therefrom, also at the same time making sure that all the fused alloy is removed from around the plunger 6. A new alloy filled thimble is then slipped into the screw cap and the latter started on the screw threads until the plunger touches the rod 4, whereupon it may be slightly unscrewed to prevent friction of the plunger against the rod, if desired.

It is now noticed that the bottom orifice of the bore 1ᵇ is closed by a screw plug 11. This plug is removed and any suitable hand tool, such as the key 12 illustrated in connection with Fig. 1, is inserted into the bore and manually moved to push the rod 4 upward as far as it will go, whereupon the plunger 6 is moved into position by fully seating the screw cap 7. The screw plug 11 is then put back in place, and the valve is restored to operative position.

The structure of Fig. 2 is substantially like the foregoing, the most important difference being that the guide rod 4 is eliminated and that, for this reason, the fluid passage through the device is entirely unobstructed. In order to effect this improvement, it is necessary to place the projection 20ᶜ, of the casing 20, above the passage through the valve. The plunger 26, in this case, rides in a recess 22ª of the valve stem 22. The shell 28 and the alloy filling 29 may remain substantially as above described, and the valve will be closed by the spring 25 under similar abnormal conditions.

It is noticed, however, that the bottom of the casing is closed, and other means of unseating the valve must, for this reason, be substituted. Such means is here shown to comprise a series of axial notches 22ᵇ, cut into the periphery of the valve stem 22, in which notches pilots 24ª of a corresponding series of screws 24 are seated, and these screws are mounted in the wall of the screw cap 23. These notches are long enough to permit the valve to close on the seat 20ª, at which point it is noted that the endwalls 22ᶜ of the notches stop very close to the pilots 24ª. When thereupon it is required again to open the valve, it is merely necessary, after the plunger mechanism has been reset as above explained, to unscrew the cap 23 sufficiently to raise the valve to its initial position, whereupon the plunger 26 is fully seated in the socket 22ª. The screw cap is then returned to its initial position, and the device is again operative. It is important to note that, during the resetting of the valve, the screw cap 23 is only partly unscrewed and that, for this reason, no leakage is experienced at this point. As the bottom of the casing is closed, it is noted that no leakage can occur at this point and, as the annular screw cap 27 is partly seated immediately after the fuse filled shell has been replaced, it is seen that the device of the invention is substantially leakproof from the time the valve closes and until the device is again fully reset.

The structure of Fig. 2 has the further advantage that no extra valve resetting tool is required and that the operation of lifting the valve is greatly facilitated.

It is sometimes advantageous to be able to close the valve from a remote point. This may be accomplished in various ways, the means illustrated in the drawings comprising a heating coil 30, and this coil is suitably seated on the shells 8 and 28. This coil is cut into a circuit through a source of electric current 31, and one or more switches 32 are provided in the circuit and placed at any point from which it may be desired to control the operation of the device.

It is noted that, in Fig. 1, the plunger mechanism is placed underneath the casing in an out of the way position, where danger of damage to the shell and coil is remote. These parts are, in Fig. 2, more exposed, but it is possible to extend the annular screw cap 27 outward to cover these parts, substantially as indicated at 27ª, thereby to eliminate danger of damage to these parts.

A simplified form of device is shown in Fig. 3 to comprise a casing 40, in which the longitudinal bore is closed at one end by a screw cap 41. The valve 42 is shown mounted on a stem 43, the upper end of which is slidable in the screw cap and the lower end is fitted to slide in the casing. The lower end of the casing is closed by a thimble 44, in which a suitable fusible member 45 is seated. The heating element 46 and its remote controls may remain as above described. Because the fusible element may soften somewhat at times when it is not supposed to fuse, it may be well to add a large disc 48 to provide a substantial bearing surface on this element.

In this simplified structure, it is seen that the valve is reset at the time a new thimble, with new fuse filler, is mounted on the casing, without having to resort to any additional operation.

The drawings are merely illustrative of the invention, and the device may be modified within the scope of the appended claims.

I claim:

1. A shut-off valve comprising, a casing having a transverse passage, a valve seat in said passage, a screw cap closing the casing and axially alined with said seat, a valve longitudinally slidable within said cap toward said seat, means normally maintaining said valve withdrawn from the seat, said means actuated by temperature conditions to release the valve for seating, and means interconnecting said cap with the said valve for returning the latter to normal withdrawn position upon partially unscrewing the said cap.

2. A shut-off valve comprising, a casing having a transverse passage, a valve seat in said passage, a screw cap closing the casing and axially alined with said seat, means urging the valve to seat, means normally maintaining the valve withdrawn from the seat, said means responsive to temperature conditions to release the valve for seating, and means interconnecting said cap with the said valve for returning the latter to its initial position upon partially unscrewing the said cap.

3. A shut-off valve comprising, a casing having a transverse passage, a valve seat in said passage, a screw cap closing the casing and axially alined with said seat, a valve longitudinally slidable within said cap toward said seat, means normally maintaining said valve withdrawn from the seat, said means actuated by temperature conditions to release the valve for seating, means controlling said temperature actuated means from a remote point, and means interconnecting said cap with the said valve for returning the latter to normal withdrawn position upon partially unscrewing the cap.

4. A shut-off valve comprising, a casing having a transverse passage, a valve seat in said passage, a screw cap closing the casing and axially alined with said seat, a valve longitudinally slidable within said cap toward said seat, a spring urging the valve toward its seat, means normally maintaining said valve withdrawn from the seat, said means comprising a plunger angularly disposed relative to said valve, a thimble axially alined with said plunger, a fusible member in said thimble normally maintaining said plunger in engagement with said valve to maintain the valve withdrawn from the seat, a spring urging the plunger against said fusible member, and a heating element seated on said thimble and actuated from a remote point to fuse said member.

5. A shut-off valve comprising, a casing having a transverse passage, a valve seat in said passage, a screw cap closing the casing and axially alined with said seat, a valve longitudinally slidable within said cap toward said seat, means normally maintaining said valve withdrawn from the seat, said means comprising a plunger, a thimble axially alined with said plunger, a fusible member in said thimble normally maintaining said plunger in engagement with said valve to maintain the valve withdrawn from the seat, a spring urging the plunger against said fusible member, a heating element seated on said thimble and actuated from a remote point, and a cap maintaining said thimble in position and having a protective flange surrounding said heating element.

6. A shut-off valve having a transverse passage and a longitudinal bore, a valve seat in said passage axially alined with said longitudinal bore, a screw cap closing said longitudinal bore, a valve slidable in said cap, means maintaining said valve withdrawn and temperature actuated to release said valve for seating on said seat, and means interconnecting said cap and the said valve for returning the valve to its initial position upon partially unscrewing said cap.

7. A shut-off valve comprising, a casing having a transverse passage and a longitudinal bore, a valve seat in said passage axially alined with said longitudinal bore, a screw cap closing said longitudinal bore, a valve slidable in said cap, means maintaining said valve withdrawn and temperature actuated to release said valve for seating on said seat, and means interconnecting said cap and valve to return the latter to its initial position.

HERBERT H. SHIELS.